United States Patent [19]

Dvorak et al.

[11] Patent Number: 4,631,624

[45] Date of Patent: Dec. 23, 1986

[54] TIME DELAY UNDERVOLTAGE RELEASE

[75] Inventors: Robert F. Dvorak, Mount Vernon; Harley W. Jansen, Marion; Henry J. Zylstra, Alburnette, all of Iowa

[73] Assignee: Square D Company, Palatine, Ill.

[21] Appl. No.: 667,928

[22] Filed: Nov. 2, 1984

[51] Int. Cl.$^4$ ............................................. H02H 3/247
[52] U.S. Cl. ........................................ 361/89; 361/92; 361/114
[58] Field of Search ................... 361/89, 92, 114, 115

[56] References Cited

U.S. PATENT DOCUMENTS

| 3,740,738 | 6/1973 | Kosanovich et al. | 361/92 |
| 3,818,276 | 6/1974 | Jacobs | 361/114 |
| 4,025,823 | 5/1977 | Lang et al. | 361/92 |

Primary Examiner—A. D. Pellinen
Assistant Examiner—Jeffrey A. Gaffin
Attorney, Agent, or Firm—Mary R. Jankousky; Richard T. Guttman

[57] ABSTRACT

A time delay undervoltage release for an electric circuit breaker causes the circuit breaker to trip when the control voltage drops below an acceptable level and prevents the breaker from being closed until the control voltage rises to a predetermined level. When the control voltage drops below an acceptable level, the undervoltage release energizes a trip solenoid to trip the breaker. A variable delay is interposed between the control voltage dropping below the acceptable level and the trip solenoid being energized. At the same time the trip solenoid is energized, an inhibit solenoid is de-energized to block the operation of the push-to-close button. When the control voltage increases to a predetermined level, the inhibit solenoid is energized, allowing the push-to-close button to be manually operated and the breaker returned to service.

17 Claims, 2 Drawing Figures

TIME DELAY UNDERVOLTAGE RELEASE

This invention relates to the field of undervoltage release mechanisms for circuit breakers, and in particular, to an undervoltage release mechanism having a variable time delay.

Circuit breakers are generally designed to function within a predetermined range of line voltages. An undervoltage release is used to trip a breaker when the control voltage drops below the "dropout" voltage. The undervoltage release should also prevent the tripped breaker from being closed until the line voltage rises above a "pick-up" voltage. An undervoltage release is needed that requires a relatively small amount of current for operation, thereby limiting the heat generated by the device.

SHORT STATEMENT OF THE INVENTION

Accordingly, the preferred embodiment of the present invention includes a control circuit, a push-to-close button, an inhibit solenoid, and a trip solenoid. The trip solenoid and push-to-close button are integral parts of the circuit breaker, while the other two components are added to provide the time delay undervoltage release function.

When the circuit breaker is in the open position and the voltage is below the "pick-up" voltage, a pin attached to the plunger of the inhibit solenoid prevents the breaker from closing by blocking the push-to-close button. Once the voltage exceeds the pick-up voltage, the control circuit energizes the inhibit solenoid, moving the attached pin to allowing an operator to depress the push-to-close button. Since the inhibit solenoid is required only to move the plunger and pin, a low energy solenoid can be used for this function. After a predetermined delay following the voltage dropping below the "dropout" value, the control circuit sends a signal to the trip solenoid to trip the breaker and a signal to deenergize the inhibit solenoid to prevent the breaker from being closed.

DESCRIPTION OF THE PREFERRED EMBODIMENT

Figure 1:
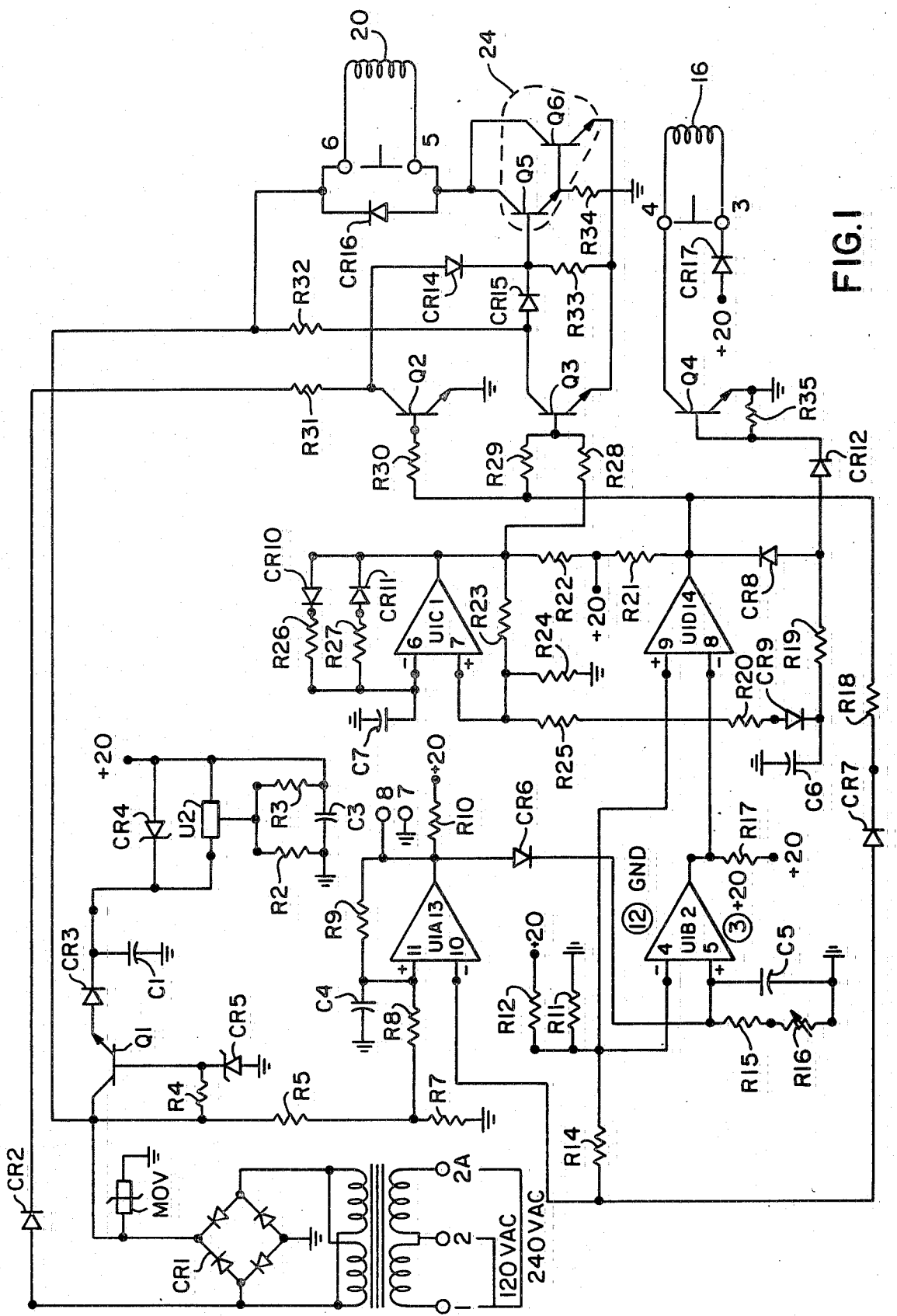
FIG. 1 is a schematic drawing of a time delay undervoltage release for a circuit breaker in accordance with a preferred embodiment of the instant invention.
Figure 2:
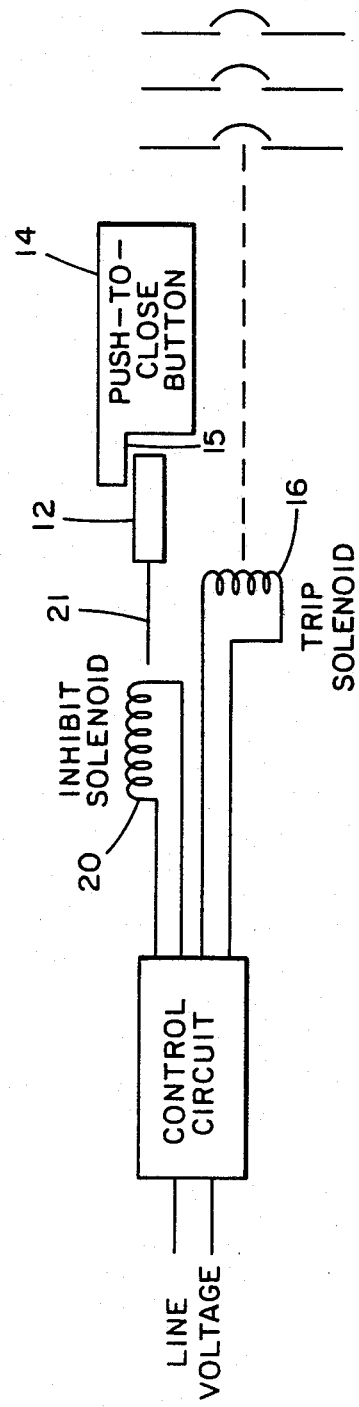
FIG. 2 is a block diagram of the preferred embodiment of FIG. 1 and the associated circuit breaker.

The electrical circuit shown in FIG. 1 monitors the line voltage going into the circuit breaker, and upon the occurrence of an unacceptable undervoltage will cause the circuit breaker to open. When the line voltage drops below a first reference voltage, the undervoltage relesae cuts off current to the inhibit solenoid and energizes the trip solenoid. Typically, this first reference voltage or dropout value is 55% of the nominal control voltage.

The line voltage is fed through a step down transformer T1 to the control circuit, making the monitored voltage directly proportional to the line voltage. Connected to the plunger 21 of the inhibit solenoid 20 is a pin 12 received under the ledge 15 of the push-to-close button 14 to prevent the push-to-close button 14 from being depressed.

When the monitored voltage exceeds a second reference voltage, the pick-up voltage, typically 80% of the nominal voltage, the control circuit energizes the inhibit solenoid 20, drawing the plunger 21 within the inhibit solenoid 20 and moving the pin 12 to allow the push-to-close button 14 to be depressed by an operator.

The inhibit solenoid 20 is a low energy solenoid to minimize the heat dissipated during the time the inhibit solenoid 20 is energized. A separate trip solenoid 16 is connected to the control circuit to be energized to trip the circuit breaker upon the occurrence of an unacceptable overcurrent. The operation of the trip solenoid 16 and associated trip unit will be discussed herein only at it relates to the preferred embodiment of the subject invention.

The line voltage is connected to transformer T1 whose output is connected across bridge CR1. The line voltage is connected to transformer terminals 1 and 2 for a 120 volt input or across terminals 1 and 2A for a 240 volt input. One input to bridge CR1 is also connected concurrently to the anode of diode CR2. The remainder of the circuit for the undervoltage release is connected across the output terminals of bridge CR1. The negative output terminal of bridge CR1 is connected to ground. The positive output terminal of bridge CR1 is connected concurrently to grounded metal oxide varistor MOV, resistor R4, resistor R5 and the collected of transistor Q1, as shown in FIG. 1.

The second side of resistor R4 is connected concurrently to the base of transistor Q1 and to the cathode of zener diode CR5, the anode of which is grounded. The emitter of transistor Q1 is connected to the anode of diode CR3, the cathode of which is connected concurrently to grounded capacitor C1, the cathode of zener diode CR4 and to the input voltage regulator U2. The adjustment terminal to voltage regulator U2 is connected concurrently to resistors R2 and R3. The other end of resistor R2 is connected concurrently to ground and to capacitor C3. The other side of capacitor C3 is connected concurrently to the second side of resistor R3, the anode of zener diode CR4 and the output terminal of voltage regulator U2. The output of voltage regulator U2 supplies a 20 volt output to various connections of the control circuit. The elements CR3, CR4, CR5, C1, C3, R2, R3, R4, Q1 and U2 supply power to the remainder of the undervoltage release circuit.

The second side of resistor R5 is connected concurrently to resistor R8 and grounded resistor R7. The second side of resistor R8 is connected concurrently to resistor R9, grounded capacitor C4 and the non-inverting input of comparator U1A. The second side of resistor R9 is connected concurrently to the output of comparator U1A, resistor R10, the anode of diode CR6, and test point 8, which is used to test the circuit. A reading can be taken across test point 8 to ground to provide an instantaneous reading of the pick-up and drop-out levels.

The cathode of diode CR6 is connected concurrently to capacitor C5, the non-inverting input of comparator U1B and resistor R15 in series with variable resistor R16. The second side of variable resistor R16 is connected concurrently with the second side of capacitor C5 and ground. The inverting input of comparator U1B is connected concurrently to resistor R12, which is supplied at its second side with 20 volts of power, grounded resistor R11, resistor R14 and the non-inverting input of comparator U1D. The second side of resistor R14 is connected concurrently to the inverting input of comparator U1A and to the anode of diode CR7.

The output of comparator of U1B is connected concurrently to resistor R17, resistor R20, resistor R25 and the inverting input of comparator U1D. The second side of resistor R17 is connected to a 20 volt power source. The second side of resistor R20 is connected with the anode of diode CR9, the cathode of which is connected concurrently to grounded capacitor C6 and to resistor R19. The second side of resistor R19 is connected concurrently to the anode of diode CR12 and to the anode of diode CR8, the cathode of which is connected concurrently to the output of comparator U1D, and resistors R18, R21, R29 and R30. The second side of resistor R18 is connected to the cathode of diode CR7.

The second side of resistor R25 is connected concurrently to the non-inverting input of comparator U1C, grounded resistor R24, and resistor R23. The inverting input of comparator U1C is connected concurrently to grounded capacitor C7, resistor R26 and resistor R27. The second side of resistor R26 is connected to the cathode of diode CR10 while the second side of resistor R27 is connected to the anode of diode CR11. The anode of diode CR10 and the cathode of diode CR11 are connected concurrently with the output of comparator UIC, and resistors R22, R23 and R28. The second side of resistor R22 is connected concurrently to resistor R21 and to a 20 volt power source.

An oscillator, made up of the elements C7, R23, R24, R25, R22 R26, R27, CR10, CR11 and UIC, supplies a periodic voltage output for a predetermined length of time at predetermined intervals.

The cathode of diode CR12 is connected concurrently to a resistor R35 and the base of transistor Q4. The emitter of transistor Q4 is connected to the second side of resistor R35 concurrently with ground. The trip solenoid 16 is connected to the collector of the transistor Q4 and the cathode of a diode CR17 which is supplied by the 20 volt power supply.

The second sides of resistors R28 and R29 are connected concurrently to the base of transistor Q3. The collector of transistor Q3 is connected concurrently to resistor R32 and to the anode of diode CR15. The cathode of diode CR15 is connected concurrently with the cathode of diode CR14, the base of transistor Q5 and resistor R33. The emitter of transistor Q5 is connected with the base of transistor Q6 concurrently with resistor R34, forming a darlington combination. The emitter of transistor Q6 is connected concurrently with the second sides of resistors R34 and R33 and to the emitter of Q3 and ground.

The collector of transistor Q5 is connected concurrently with the collector of transistor Q6, the anode of diode CR16 and a terminal 5. The cathode of diode CR16 is connected concurrently to terminal 6, resistor R32 and the junction between the collector of transistor Q1, resistors R4 and R5 and the input of metal oxide varistor M, as discussed earlier. The inhibit solenoid 20 is located across terminals 5 and 6 in parallel with diode CR16.

The cathode of diode CR2 is connected to a resistor R31, the other side of which is connected concurrently to the anode of diode CR14 and the collector of transistor Q2. The emitter of transistor Q2 is grounded while the base of transistor Q2 is connected to the second side of resistor R30.

OPERATION

To energize the above described electrical circuit, an AC input voltage is placed across terminals 1 and 2 or 1 and 2A, depending on the voltage level of the input. This input voltage is coupled across the transformer T1 and voltage supplied to the inputs of the rectifier bridge CR1. As the voltage across bridge CR1 increases, transistor Q1 is turned on allowing current to flow through diode CR3 to charge up capacitor C1. The metal oxide varistor M suppresses transient voltages at the output of the bridge CR1.

Zener diode CR4 also suppresses transients to prevent an excess voltage from being introduced across voltage regulator U2. Normally zener diode CR4 is not operative. Voltage regulator U2 supplies a power supply to various components of the control circuit. The voltage level of the power supply is established by the values chosen for resistors R2 and R3.

Sufficient charge is stored in capacitor C1, the main storage capacitor, so that after the monitored voltage drops below an acceptable voltage, capacitor C1 will supply sufficient energy to operate the control circuit and to activate the trip solenoid 16.

The non-inverting input to comparator U1A is proportional to the input voltage. When the non-inverting input at pin 11 exceeds the inverting input at pin 10, the output of comparator U1A goes high, sending a signal to pin 5 of comparator U1B and charging up capacitor C5. As the voltage across capacitor C5 and at pin 5 exceeds the voltage at pin 4, comparator U1B goes high.

The high output of U1B is sent to pin 8 of comparator U1D, causing the output of comparator U1D to go low and shutting off the base current to transistors Q2 and Q3. The current which had been flowing through transistors Q2 and Q3 is now diverted to the base of the darlington combination of transistors Q5 and Q6 to energize the same. The inhibit solenoid 20 is thereby energized to attract the plunger and to move the pin 12, allowing the push-to-close button 14 to be depressed and the breaker closed.

When the circuit breaker is closed and the monitored voltage reaches an unacceptable undervoltage or "drop out" level, the control circuit causes the breaker to trip, deactivating the inhibit solenoid 20 to prevent the push-to-close button 14 from being depressed. When the monitored voltage drops below the "drop out" level, the input to non-inverting pin 11 drops below the input at inverting pin 10, causing comparator UIA to go low and shutting off the voltage source to capacitor C5. Capacitor C5 then begins to discharge through resistor R15 and variable resistor R16. When the voltage across C5 drops below the reference voltage at pin 4, the output of comparator U1B goes low. Capacitor C5 is normally charged up to 20 volts, while the input at pin 4 is normally 5 volts. The length of time required for capacitor C5 to discharge from 20 volts to 5 volts depends upon the total resistance chosen for resistor R15 and variable resistor R16. In the preferred embodiment of the subject invention, the variable resistor R16 is selectable for a resistance value resulting in a time delay adjustable from approximately 0.1 seconds to 1.4 seconds.

After comparator U1B goes low, the voltage at pin 8 drops below the reference voltage at pin 9, causing comparator U1D to go high. The high output of comparator U1D allows capacitor C6 to drive transistor Q4 which energizes the trip solenoid 16 to trip the breaker.

The high output of comparator U1D also turns on transistors Q2 and Q3 which in turn removes both the full and half wave drive to the darlington combination 24.

The inhibit solenoid is energized during the entire time period the circuit breaker is open so long as sufficient voltage exists to properly operate the control circuit. To reduce the heat dissipated by the inhibit solenoid, an inhibit solenoid that operates on a relatively small current should be selected.

In the preferred embodiment shown, the voltage normally supplied by the darlington combination Q5 and Q6 is relatively small. To insure that the momentum of moving the pin 12 is easily overcome, a periodic voltage signal from the oscillator causes additional voltage to be supplied to the darlington combination 24. When the output of comparator U1C is high, voltage will be supplied to the base of transistor Q3, thereby diverting current through transistor Q3 that otherwise would be directed to the base of the darlington transistor combination 24.

When the output of comparator U1C is high, capacitor C7 is charged up through resistor R26. When the voltage across capacitor C7 surpasses the voltage at pin 7, the output of comparator U1C goes low. Capacitor C7 then discharges through resistor R27. When the voltage across capacitor C7 is below the voltage at pin 7, the capacitor C7 begins charging again. In the preferred embodiment shown, the output of comparator U1C is high most of the time since the capacitor C7 charges through a one megaohm resistor R26 and discharges through a 33 kilohm resistor R27.

The oscillator periodically supplies a pulse to transistor Q3 which allows the darlington combination 24 to periodically supply the inhibit solenoid 20 with one cycle of rectified full wave to move the plunger 21 and pin 12 to a retracted position within the inhibit solenoid 20. In the preferred embodiment described herein, the full wave signal is supplied approximately once a second for a 20 millisecond duration. The rectified half wave generally seen by the inhibit solenoid 20 is sufficient to hold the plunger 21 and pin 12 to the retracted position. The pulse provided by the oscillator is repeated approximately every second to provide for the contingency where the push-to-close button 14 is depressed prior to the inhibit solenoid 20 being energized. The repeated supply of the extra voltage insures that once the push-to-close button 14 is released, the plunger 21 and pin 12 will be moved within the inhibit solenoid 20 and the push-to-close button 14 may be depressed.

While there has been shown and described a particular embodiment of subject invention, it will be obvious to those skilled in the art that changes and modifications may be made without departing from the spirit of the invention.

We claim:

1. A circuit breaker comprising:
separable contacts;
an operating mechanism to open and close the separable contacts;
an activation button to signal the operating mechanism to close the separable contacts;
a control voltage source;
test means coupled to said control voltage source for establishing a test voltage proportional to said control voltage;
reference means coupled to said control voltage source for establishing a reference voltage;
an inhibit solenoid having a plunger with a first position and a second position, said inhibit solenoid being connected to the operating mechanism to open the separable contacts upon activation of said solenoid means;
a pin connected to said inhibit solenoid and adapted to obstruct the operation of the activation button when the plunger is in the first position; and
differential means having inputs connected to said test means and to said reference means and having an output connected to said inhibit solenoid, said differential means activating said inhibit solenoid and causing said inhibit solenoid plunger to move to the first position whenever the test voltage drops below the reference voltage, said differential means causing said inhibit solenoid plunger to move to the second position whenever the test voltage rises above the reference voltage.

2. A circuit breaker comprising:
separable contacts;
an operating mechanism to open and close the separable contacts;
an activation button to signal the operating mechanism to close the separable contacts;
a control voltage source;
test means coupled to said control voltage source for establishing a test voltage proportional to said control voltage;
reference means coupled to said control voltage source for establishing a first reference voltage and a second reference voltage;
a trip solenoid connected to the operating mechanism to open the separable contacts upon activated of the trip solenoid;
an inhibit solenoid having a plunger with a first position and a second position;
a pin connected to the inhibit solenoid and adapted to obstruct the operation of the activation button when the plunger is in the first position; and
differential means having inputs connected to said test means and to said reference means and having an output connected to said trip solenoid and said inhibit solenoid, said differental means activating said trip solenoid and causing said inhibit solenoid plunger to move to the first position when the test voltage drops below the first reference voltage and said differential means causing said inhibit solenoid plunger to move to the second position when the test voltage rises above the second reference voltage.

3. A circuit breaker comprising:
separable contacts;
an operating mechanism to open and close the separable contacts;
an activation button to signal the operating mechanism to close the separable contacts;
a control voltage source;
test means coupled to said control voltage source for establishing a test voltage proportional to said control voltage;
reference means coupled to said control voltage source for establishing a reference voltage;
a trip solenoid connected to the operating mechanism to open the separable contacts upon activation of the trip solenoid;
an inhibit solenoid having a plunger with a first position and a second position;

a pin connected to the inhibit solenoid and adpated to obstruct the operation of the activation button when the plunger is in the first position; and differential means having inputs connected to said test means and to said reference means and having an output connected to said trip solenoid and said inhibit solenoid, said differential means activating said trip solenoid and causing said inhibit solenoid plunger to move to the first position whenever the test voltage drops below the reference voltage, said differential means causing said inhibit solenoid plunger to move to the second position whenever the test voltage rises above the reference voltage.

4. A circuit breaker as claimed in claim 2 wherein said inhibit solenoid plunger moves to the first position when the inhibit solenoid is de-energized and move to the second position when the inhibit solenoid is energized.

5. A circuit breaker as claimed in claim 2 additionally comprising means for providing a time delay after the test voltage drops below the first reference voltage and before energizing the trip solenoid.

6. A circuit breaker as claimed in claim 5 wherein the time delay provided by the time delay means may be set externally.

7. A circuit breaker as claimed in claim 2 additionally comprising an electronic switch electrically connected to said inhibit solenoid, said electronic switch periodically supplying additional power to said inhibit solenoid during the time period said inhibit solenoid is being energized.

8. A circuit breaker as claimed in claim 7 additionally comprising means for providing a time delay after the test voltage drops below the first reference voltage and before energizing the trip solenoid.

9. A circuit breaker as claimed in claim 8 wherein the time delay provided by the time delay means may be set externally.

10. A circuit breaker protecting an electrical system, said circuit breaker having an input from a control voltage source, said circuit breaker opening the electrical system when the control voltage is below a first predetermined value and said circuit breaker closing the electrical system when the control voltage is above a second predetermined value, said circuit breaker comprising:

separable contacts;
an activation button for manually closing said separable contacts;
sensing means for sensing the control voltage;
an inhibit solenoid with a pin biased by a spring, the pin having a first position and a second position, the pin preventing the activation button from closing the separable contacts when the pin is in the first position;
control means for moving the pin to the first position when the control voltage is below the first predetermined value, and for moving the pin to the second position when the control voltage is above the second predetermined value.

11. A circuit breaker as claimed in claim 10 wherein said pin is spring biased to the first position and said pin is moved to the second position upon the energization of the inhibit solenoid via the control means.

12. A circuit breaker as claimed in claim 10 wherein said control means includes an electrical circuit connected to said inhibit solenoid, said pin being biased to one position by the spring, said pin being moved to the other position when the inhibit solenoid is energized.

13. A circuit breaker as claimed in claim 12 additionally comprising an electronic switch electrically connected to said inhibit solenoid to periodically supply additional power to said inhibit solenoid during the time period said inhibit solenoid is energized.

14. A circuit breaker connected to a voltage supply, said circuit breaker comprising:

separable contacts;
an operating mechanism to open the close said separable contacts;
an activation buttom to cause said operating mechanism to close said contacts;
test means connected to the control voltage and establishing a test voltage proportional to the control voltage;
reference means connected to the control voltage and establishing a first reference voltage and a second reference voltage;
comparator means connected to said test means and said reference means, said comparator means sending a first signal when the control voltage drops below the first reference voltage and sending a second signal when the control voltage rises above the second reference voltage;
a trip solenoid activating the operating mechanism to open the separable contacts upon the energization of the trip solenoid;
an inhibit solenoid associated with the activation button to prevent closing of the separable contacts when the inhibit solenoid is not energized; and
switching means having an input connected to said comparator means and having an output connected with said trip solenoid and said inhibit solenoid, said switching means energizing said trip solenoid upon receiving the first signal, said switching means energizing said inhibit solenoid upon receiving the second signal.

15. A circuit breaker as claimed in claim 14 further comprising a second switching means having an input connected to said comparator means and having an output connected to said inhibit solenoid, said second switching means energizing said inhibit solenoid at periodic intervals upon receipt of the second signal.

16. A circuit breaker as claimed in claim 14 further comprising time delay means for providing a time delay after the control voltage drops below the first reference voltage and before said comparator means sends the first signal.

17. A circuit breaker as claimed in claim 16 wherein said time delay means provides a time delay that may be varied by an operator.

* * * * *

UNITED STATES PATENT AND TRADEMARK OFFICE
CERTIFICATE OF CORRECTION

PATENT NO. : 4,631,624
DATED : December 23, 1986
INVENTOR(S) : Robert F. Dvorak, et al.

It is certified that error appears in the above—identified patent and that said Letters Patent is hereby corrected as shown below:

Col. 1, line 56, change "relesae" to -- release --.
Col. 2, line 27, change "collected" to -- collector --.
Col. 3, line 59, change "M" to -- MOV --.
Col. 4, line 11, change "M" to -- MOV --.
Col. 6, line 34, change "activated" to -- activation --.
Col. 8, line 20, change "buttom" to -- button --.

Signed and Sealed this

Second Day of June, 1987

Attest:

DONALD J. QUIGG

Attesting Officer

Commissioner of Patents and Trademarks